United States Patent
Couves et al.

(10) Patent No.: US 11,407,654 B2
(45) Date of Patent: *Aug. 9, 2022

(54) METHOD OF CONTROLLING SALINITY OF A LOW SALINITY INJECTION WATER

(71) Applicant: BP Exploration Operating Company Limited, Middlesex (GB)

(72) Inventors: John William Couves, Bourne End (GB); John Henry Crouch, Odell (GB); John Dale Williams, Beaconsfield (GB)

(73) Assignee: BP EXPLORATION OPERATING COMPANY LIMITED, Middlesex (GB)

( * ) Notice: Subject to any disclaimer, the term of this patent is extended or adjusted under 35 U.S.C. 154(b) by 474 days.

This patent is subject to a terminal disclaimer.

(21) Appl. No.: 16/628,633

(22) PCT Filed: Jul. 12, 2018

(86) PCT No.: PCT/EP2018/069044
§ 371 (c)(1),
(2) Date: Jan. 3, 2020

(87) PCT Pub. No.: WO2019/012089
PCT Pub. Date: Jan. 17, 2019

(65) Prior Publication Data
US 2021/0130193 A1 May 6, 2021

(30) Foreign Application Priority Data

Jul. 12, 2017 (EP) .................................. 17181022

(51) Int. Cl.
*C02F 1/00* (2006.01)
*B01D 61/02* (2006.01)
(Continued)

(52) U.S. Cl.
CPC ............ *C02F 1/008* (2013.01); *B01D 61/022* (2013.01); *B01D 61/025* (2013.01);
(Continued)

(58) Field of Classification Search
CPC ............ B01D 2313/18; B01D 2317/04; B01D 2317/08; B01D 61/022; B01D 61/025;
(Continued)

(56) References Cited

U.S. PATENT DOCUMENTS 10,329,171 B2 * 6/2019 Henthorne ............. B01D 61/12
2012/0261340 A1 10/2012 Williams
2013/0213892 A1 8/2013 Henthorne

FOREIGN PATENT DOCUMENTS

WO 2007/138327 A1 12/2007

OTHER PUBLICATIONS

PCT/EP2018/069044 International Search Report and Written Opinion dated Aug. 27, 2018 (10 p.).

* cited by examiner

*Primary Examiner* — Terry K Cecil
(74) *Attorney, Agent, or Firm* — Conley Rose, P.C.

(57) ABSTRACT

An integrated system includes a desalination plant including a reverse osmosis (RO) array to produce an RO permeate blending stream and a nanofiltration (NF) array to produce an NF permeate blending stream. The integrated system also includes a blending system. Further, the integrated system includes a control unit. Still further, the integrated system includes an injection system for one or more injection wells that penetrate an oil-bearing layer of a reservoir. Moreover, the integrated system includes a production facility to separate fluids produced from one or more production wells that penetrate the oil-bearing layer of the reservoir and to deliver a produced water (PW) stream to the blending system. The blending system is configured to blend the RO permeate and (Continued)

NF permeate blending streams with the PW stream to produce a blended low salinity water stream. The control unit is configured to dynamically alter operation of the blending system to adjust amounts of at least one of the RO permeate blending stream and the NF permeate blending stream to maintain a composition of the blended low salinity water stream within a predetermined operating envelope.

14 Claims, 1 Drawing Sheet

(51) Int. Cl.
| | |
|---|---|
| *B01D 61/08* | (2006.01) |
| *B01D 61/12* | (2006.01) |
| *C02F 1/44* | (2006.01) |
| *C09K 8/58* | (2006.01) |
| *E21B 43/20* | (2006.01) |
| *E21B 43/40* | (2006.01) |
| *B01F 23/40* | (2022.01) |
| *B01F 35/22* | (2022.01) |
| *B01F 35/21* | (2022.01) |
| *C02F 103/08* | (2006.01) |
| *C02F 103/10* | (2006.01) |
| *B01F 101/49* | (2022.01) |

(52) U.S. Cl.
CPC ........... *B01D 61/027* (2013.01); *B01D 61/08* (2013.01); *B01D 61/12* (2013.01); *B01F 23/405* (2022.01); *B01F 35/21112* (2022.01); *B01F 35/2209* (2022.01); *C02F 1/441* (2013.01); *C02F 1/442* (2013.01); *C09K 8/58* (2013.01); *E21B 43/20* (2013.01); *E21B 43/40* (2013.01); *B01D 2313/18* (2013.01); *B01D 2317/04* (2013.01); *B01D 2317/08* (2013.01); *B01F 2101/49* (2022.01); *C02F 2103/08* (2013.01); *C02F 2103/10* (2013.01); *C02F 2201/005* (2013.01); *C02F 2209/05* (2013.01); *C02F 2209/10* (2013.01); *C02F 2209/40* (2013.01)

(58) Field of Classification Search
CPC ...... B01D 61/027; B01D 61/08; B01D 61/12; B01D 61/58; B01F 2101/49; B01F 23/405; B01F 35/21112; B01F 35/2209; C09K 8/58; E21B 43/20; E21B 43/40; Y02A 20/131; C02F 1/008; C02F 1/441; C02F 1/442; C02F 2103/08; C02F 2103/10; C02F 2201/005; C02F 2209/05; C02F 2209/10; C02F 2209/40
See application file for complete search history.

METHOD OF CONTROLLING SALINITY OF A LOW SALINITY INJECTION WATER

CROSS-REFERENCE TO RELATED APPLICATIONS

This application is a 35 U.S.C. § 371 national stage application of PCT/EP2018/069044 filed Jul. 12, 2018 and entitled "Method of Controlling Salinity of a Low Salinity Injection Water," which claims priority to European Application No. 17181022.9 filed Jul. 12, 2017 and entitled "Method of Controlling Salinity of a Low Salinity Injection Water," both of which are hereby incorporated herein by reference in their entirety for all purposes.

STATEMENT REGARDING FEDERALLY SPONSORED RESEARCH OR DEVELOPMENT

Not applicable.

BACKGROUND

Field of the Disclosure

The present disclosure generally relates to controlling the salinity of a low salinity injection water during a low salinity waterflood when a variable amount of produced water (and/or a variable quality produced water) is disposed of as a blending stream for a blended low salinity injection water. The present disclosure also relates to controlling the concentration of one or more individual ions or types of individual ions in the low salinity injection water stream when variable amounts of produced water (and/or a variable quality produced water) is disposed of as a blending stream for the blended low salinity injection water.

Background

A problem associated with low salinity water-flooding is that desalination techniques may yield water having a lower than optimal salinity for continuous injection into an oil bearing reservoir. Indeed, the desalinated water may be damaging to the oil-bearing rock formation of the reservoir and may inhibit oil recovery, for example, by causing swelling of clays in the formation. Thus, there is an optimal salinity for the injection water that provides the benefit of enhanced oil recovery whilst mitigating the risk of formation damage, and the optimum value may vary from formation to formation. Typically, where an oil-bearing formation comprises rock that contains high levels of swelling clays, formation damage may be avoided, while still releasing oil from the formation, when the injection water has a total dissolved solids content (TDS) in the range of 200 to 10,000 ppm and the ratio of the concentration of multivalent cations in the low salinity injection water to the concentration of multivalent cations in the connate water of the reservoir is less than 1, for example, less than 0.9.

A further problem associated with low salinity water-flooding is that the sulfate level of the low salinity injection water should typically be controlled to a value of less than 100 mg/L (preferably, less than 50 mg/L, and more preferably, less than 40 mg/L) in order to mitigate the risk of souring or scaling of the reservoir. Souring arises through the proliferation of sulfate-reducing bacteria that use sulfate in their metabolic pathway, thereby generating hydrogen sulfide. Scaling arises from deposition of mineral scale upon mixing of a sulfate containing injection water with a connate water containing precipitate precursor cations such as barium cations.

Yet a further problem arises offshore in that there is a need to dispose of increasing amounts of produced water during a low salinity waterflood. It is generally prohibited to dispose of produced water into a body of water (e.g., the ocean). Also, owing to the costs of drilling wells offshore, there is often no dedicated produced water disposal well. It may therefore be necessary to dispose of the produced water (PW) by blending with a low salinity injection water. The quantity and quality of the PW that is required to be blended with the low salinity injection water may vary over the life of the low salinity waterflood.

Definitions

Throughout the following description the following terms are referred to:

"High salinity feed water" is the feed water for a desalination plant and is typically seawater (SW), estuarine water, aquifer water or mixtures thereof.

A "reverse osmosis (RO) filtration unit" comprises a pressure vessel, alternatively called a housing, containing one or more RO membrane elements; preferably, between 1 and 8 RO membrane elements and, in particular, between 4 and 8 RO membrane elements.

A "nanofiltration (NF) filtration unit" comprises a pressure vessel containing one or more NF elements: preferably, between 1 and 8 membrane elements and, in particular, between 4 and 8 NF membrane elements.

A "reverse osmosis (RO) stage of a desalination plant" is a group of RO filtration units connected together in parallel. Similarly, a "nanofiltration (NF) stage of a desalination plant" is a group of NF filtration units connected together in parallel.

A "membrane block" comprises stages of RO and NF filtration connected together to provide concentrate staging and typically shares common valving and piping. A membrane block of two or more membrane blocks may be mounted on a skid.

"Produced water (PW)" is water separated from oil and gas at a production facility. Produced water may comprise connate water, invading aquifer water from an underlying aquifer or any previously injected aqueous fluid such as seawater (SW).

"Connate water" is the water present in the pore space of an oil-bearing layer of a reservoir.

"Aqueous drive fluid" is an aqueous fluid that may be injected into an injection well after injection of a low pore volume (PV) slug of the blended low salinity injection water.

"Bank of oil" is a term well known to the person skilled in the art and refers to a portion of the layer(s) of reservoir rock where the oil saturation is increased because of the application of an enhanced oil recovery process that targets immobile oil.

"Main phase of a low salinity waterflood" refers to a phase of the low salinity waterflood following commissioning of a low salinity injection well.

"Commissioning of a low salinity injection well" refers to a period of up to several days during which the salinity of the injection water may be gradually reduced or there may be stepped reductions in salinity until the composition of the injection well falls within an operating envelope for the main phase of the low salinity waterflood.

"Quality of the produced water (PW) blending stream" relates to the total dissolved solids content and/or the concentrations of individual ions or types of individual ions and/or ratios of individual ions or ratios of types of individual ions in the PW.

"Swept pore volume" is the pore volume of the layer(s) of reservoir rock swept by the injected fluids (low salinity injection water and any aqueous drive fluid) between an injection well and production well, averaged over all flow paths between the injection well and production well. Where an injection well has two or more associated production wells, the term "swept pore volume" means the pore volume of the layer(s) of reservoir rock swept by the injected fluids between the injection well and its associated production wells.

"Slug" is a low pore volume of a fluid that is injected into an oil-bearing layer of a reservoir. The values of pore volumes given for the slugs of low salinity injection water are based on the swept pore volume of the layer(s) of reservoir rock.

"TDS content" is the total dissolved solids content of an aqueous stream and typically has units of mg/L.

DETAILED DESCRIPTION

Embodiments disclosed herein relate to integrated systems and methods for producing a blended low salinity injection water comprising variable amounts of produced water or a variable quality of produced water while maintaining the composition of the blended low salinity injection water within a predetermined operating envelope for the main phase of a low salinity waterflood that balances maximizing enhanced oil recovery from the reservoir while minimizing the risk of formation damage, souring or scaling of the reservoir.

In some embodiments, the integrated system comprises a desalination plant comprising a reverse osmosis (RO) array to produce an RO permeate blending stream and a nanofiltration (NF) array to produce an NF permeate blending stream. The integrated system also comprises a blending system, a control unit, and an injection system for one or more injection wells that penetrate an oil-bearing layer of a reservoir. The integrated system further includes a production facility to separate fluids produced from one or more production wells that penetrate the oil-bearing layer of the reservoir and to deliver a produced water (PW) stream to the blending system. The blending system is to blend the RO permeate and NF permeate blending streams with the PW stream to produce a blended low salinity water stream. The control unit is to dynamically alter operation of the blending system to adjust amounts of at least one of the RO permeate blending stream and the NF permeate blending stream to maintain a composition of the blended low salinity water stream within a predetermined operating envelope. In some embodiments, the control unit is to receive the operating envelope from a source external to the control unit. In some embodiments, to alter the operation of the blending system, the control unit is to adjust amounts of RO permeate discharged from the blending system via an RO permeate dump line. In some embodiments, to alter the operation of the blending system, the control unit is to adjust amounts of NF permeate discharged from the blending system via an NF permeate dump line. In some embodiments, the operating envelope specifies upper and lower limits for a parameter selected from the group consisting of: total dissolved solids (TSS) content; ionic strength; concentrations of individual ions; concentration of types of individual ions; ratios of types of individual ions; and ratios of individual ions.

In some embodiments, a method comprises producing a reverse osmosis (RO) permeate blending stream using an RO array of a desalination plant; producing a nanofiltration (NF) permeate blending stream using an NF array of a desalination plant; separating fluids produced from one or more production wells that penetrate an oil-bearing layer of a reservoir to produce a produced water (PW) stream; blending the RO permeate blending stream, the NF permeate blending stream, and the PW stream in a blending system to produce a blended low salinity water stream; and dynamically adjusting operation of the blending system to adjust amounts of the RO permeate blending stream and the NF permeate blending stream to maintain a composition of the blended low salinity water stream within a predetermined operating envelope. In some embodiments, blending comprises blending seawater (SW) with the RO permeate blending stream, the NF permeate blending stream, and the PW stream in the blending system to produce a blended low salinity water stream. In some embodiments, dynamically adjusting the operation of the blending system comprises adjusting a valve in the blending system. In some embodiments, the valve comprises a valve on an RO permeate dump line. In some embodiments, the valve comprises a valve on an NF permeate dump line. In some embodiments, wherein the valve comprises a valve on a high salinity water by-pass line that by-passes the desalination plant and feeds SW to the blending system.

In some embodiments, an integrated system comprises a control unit; a plurality of valves controlled by the control unit; a plurality of flow rate and composition monitors to provide measured flow rate data and composition data, respectively, to the control unit; and a reverse osmosis (RO) array to produce an RO permeate blending stream. The integrated system additionally comprises a nanofiltration (NF) array to produce an NF permeate blending stream; a produced water (PW) stream from a production well; and a blending system comprising a line to blend the RO permeate blending stream, the NF permeate blending stream, and the PW stream into a blended low salinity water stream. The control unit is to adjust, in response to the measured flow rate and composition data, at least one of the plurality of valves to maintain a composition of the blended low salinity water stream within a predetermined operating envelope. In some embodiments, the flow rate data and composition data pertain to the blended low salinity water stream. In some embodiments, an injection system is to deliver the blended low salinity water stream to a formation via an injection well. In some embodiments, the operating envelope specifies upper and lower limits for a parameter selected from the group consisting of: total dissolved solids (TDS) content; ionic strength; concentrations of individual ions; concentration of types of individual ions; ratios of types of individual ions; and ratios of individual ions. In some embodiments, the plurality of valves includes a first valve on an RO permeate dump line and further includes a second valve on an NF permeate dump line.

Typically, the blending system may blend the RO permeate and NF permeate blending streams prior to blending the resulting combined RO permeate and NF permeate stream with the PW blending stream. Accordingly, the blending system may have a blending point at which the RO permeate and NF permeate feed lines combine to form a combined RO permeate and NF permeate feed line.

Embodiments of the integrated systems disclosed herein may be located on a platform or a Floating Production Storage and Offloading facility (FPSO) and may be used for injecting a blended low salinity injection water stream into at least one oil-bearing layer of an offshore reservoir. Alternatively, the desalination plant of embodiments of the integrated systems disclosed herein may be located onshore and the RO permeate and NF permeate streams may be delivered to a blending system located on a platform or FPSO for blending with the PW stream.

The control unit of the integrated system may include a CPU (Central Processing Unit), a RAM (Random Access Memory), a ROM (Read Only Memory), a HDD (Hard Disk Drive), I/F (Interfaces), computer-executable code (e.g., software and/or firmware), and the like.

Boundary values for the composition of the blended low salinity injection water stream for the main phase of the low salinity waterflood may be inputted into the control unit of the integrated system. These boundary values define an operating envelope for the composition of the blended low salinity injection water stream. The operating envelope may be defined by boundary values (upper and lower limits) for one or more of the TDS content (salinity), ionic strength, the concentrations of individual ions (such as sulfate anions, nitrate anions, calcium cations., magnesium cations or potassium cations), the concentrations of types of individual ions (such as monovalent cations, monovalent anions, multivalent anions, multivalent cations, or divalent cations), ratios of types of individual ions, or ratios of individual ions (such as Sodium Adsorption Ratio).

Sodium Adsorption Ratio (SAR) is used to assess the state of flocculation or of dispersion of clays in the reservoir rock. Typically, sodium cations facilitate dispersion of clay particles while calcium and magnesium cations promote their flocculation. A formula for calculating the Sodium Adsorption Ratio (SAR) is:

$$SAR = \frac{[Na^+]}{\sqrt{(0.5[Ca^{2+}] + [Mg^{2+}])}}$$

wherein sodium, calcium, and magnesium cation concentrations of the blended low salinity injection water are expressed in milliequivalents/litre.

Compositions within the operating envelope are those predicted to achieve enhanced oil recovery (EOR) from the reservoir while avoiding or minimizing the risk of formation damage. Where there is a souring risk or scaling risk for the reservoir, compositions within the operating envelope are preferably those that are also predicted to mitigate reservoir souring or inhibit scaling. The person skilled in the art will understand that not all reservoirs present a souring risk or a scaling risk. Thus, souring may occur when a reservoir contains an indigenous population of sulfate reducing bacteria (SRB) that obtain energy by oxidizing organic compounds while reducing sulfate to hydrogen sulfide. Scaling may occur when a connate water containing high levels of precipitate precursor cations such as barium and strontium cations mixes with an injection water containing relatively high amounts of sulfate anions resulting in the precipitation of insoluble sulfate salts (mineral scales).

Different boundary values for each parameter may be inputted into the control unit, thereby defining different operating envelopes for the composition of the blended low salinity injection water where the different operating envelopes balance different levels of enhanced oil recovery (EOR) with different levels of risk of formation damage, reservoir souring or scaling.

In order to maintain the composition of the blended low salinity water within a predefined or predetermined operating envelope for the composition of the blended low salinity injection water for the main phase of the low salinity flood, the amounts of NF permeate stream and/or RO permeate stream that are blended with the produced water (PW) may be adjusted in real time in response to changes (increases or decreases) in the amount of PW to be disposed of in the blended low salinity injection water stream or changes in the quality (increases or decreases in the TDS content, concentration of one or more individual ions, concentration of one or more types of individual ions, a ratio of individual ions or a ratio of types of individual ions) of the produced water.

In the blending system of embodiments of the integrated systems disclosed herein, the amount of the NF permeate stream or of the RO permeate available for blending with the PW to form the blended low salinity injection water stream may be rapidly adjusted (in real time) by discharging varying amounts of the NF permeate stream or RO permeate stream from the blending system, for example, into a body of water (the ocean), via an NF permeate or RO permeate "dump line" respectively that are each provided with a "dump valve". The dump valve is an adjustable valve (e.g., a throttle valve) that may be set to various positions (between a fully closed and fully open position) to adjust the amounts of NF permeate or RO permeate discharged from the blending system.

If the discharge of excess NF permeate or excess RO permeate continues for a prolonged period of time, for example, hours or days, then the control unit may make adjustments to the desalination plant by taking one or more of the NF units of the array or RO units of the RO array off-line thereby reducing the production capacity of NF permeate or RO permeate respectively. If the discharge of excess NF permeate or RO permeate continues for weeks or months, optionally, the NF elements of one or more of the NF units of the desalination plant may be replaced by RO elements or the RO elements of one or more of the RO units may be replaced by NF elements to increase the amount of RO permeate or of NF permeate produced by the plant.

It is known that divalent cations may be beneficial for stabilizing clays. Optionally, the desalination plant may have a by-pass line for the high salinity water used as feed to the RO and NF arrays of the plant as this high salinity feed water (for example, seawater (SW)) typically contains high levels of divalent cations. This by-pass line is used for delivering a high salinity water blending stream (for example, a SW blending stream) to the blending system. Accordingly, the blending system optionally has a SW feed line. The by-pass line for the high salinity feed water may be provided with an adjustable valve (e.g., a throttle valve) that may be set to various positions between a fully closed and fully open position thereby providing variable amounts of high salinity water (e.g. SW) for blending with the RO permeate stream, NF permeate stream and PW stream to form the blended low salinity injection water. However, if desired, any excess high salinity water may also be discharged from the blending system to the ocean via a high salinity water dump line provided with an adjustable valve (e.g. a throttle valve). The use of an adjustable valve on the optional SW by-pass line (or on a SW dump line provided with an adjustable valve) also allows for rapid adjustments (in real time) to the composition of the blended low salinity injection water stream.

The control unit may therefore alter the amount of any high salinity water (e.g. SW) included in the blended low salinity injection water stream in response to changes in the amount or quality of the PW blending stream to maintain the composition of the blended low salinity water stream within the predetermined (preselected) operating envelope. The person skilled in the art will understand that SW contains high levels of sulfate anions. Accordingly, when blending the RO permeate stream, NF permeate stream and PW stream with SW any souring or scaling risk for the must be rigorously managed.

The souring risk or scaling risk for a reservoir may be managed by inputting into the control unit an upper limit (boundary value) for the sulfate concentration of the blended low salinity injection water of typically 100 mg/L; preferably, 50 mg/L, and in particular, 40 mg/L.

The blending system of the integrated system may optionally comprise a tank (for storing a concentrate comprising an aqueous solution or dispersion of one or more clay stabilizing additives) and a feed line for delivering a concentrate. The concentrate feed line may be provided with an adjustable valve (e.g. a throttle valve) that may be set to various positions between a fully closed and fully open position, thereby providing variable amounts of concentrate for blending with the RO permeate, NF permeate, PW and optional SW streams to maintain the composition of the blended low salinity injection window within an operating envelope that is further defined by boundary values (upper and lower limits) for the concentration(s) of the clay stabilizing additive(s). Alternatively, the concentrate tank may be provided with a metering pump that provides an accurate amount of concentrate for blending and with a flow rate meter that may be used to adjust the flow rate of the concentrate. The control unit may therefore monitor the flow rate of the concentrate stream in the concentrate feed line in real time and may make rapid adjustments to the flow rate of the concentrate using the adjustable valve, thereby changing the concentration of the one or more clay stabilizing additives in the blended injection water stream. Accordingly, the control unit may also change the operation of the blending system in response to changes in the amount or quality of the PW blending stream to adjust the amount of clay stabilizing concentrate in the blended low salinity injection water stream, thereby maintaining the composition within the operating envelope that is further defined by boundary values for the clay stabilizing additive(s).

The clay stabilizing additive(s) may be an inorganic salt such as a salt of a divalent cation or a potassium salt. Preferably, the salt of the divalent cation may be a calcium or magnesium salt such as calcium chloride, calcium bromide, calcium nitrate, magnesium chloride, magnesium bromide or magnesium nitrate. Preferably, the salt of the divalent cation is calcium chloride or calcium nitrate. Preferably, the potassium salt is selected from potassium chloride, potassium bromide and potassium nitrate. Calcium nitrate or potassium nitrate may also have the advantage of providing souring control as the nitrate anion may encourage the growth of nitrate reducing bacteria that may out-compete SRB for nutrients and assimilable organic carbon.

The control unit may automatically adjust the operation of the blending system and, hence, the amounts of the RO permeate stream, NF permeate stream (and of any optional high salinity water blending stream such as SW or any optional clay stabilizer concentrate stream) that are included in the blended low salinity injection water stream in response to variations on the quantity and/or quality of the PW so as to keep the composition of the injection water within the inputted boundary values that define the operating envelope for the blended low salinity injection water. Thus, the flow rate and composition of the PW stream may be monitored in real time. Similarly, the flow rate and composition of the blended low salinity injection water may be monitored in real time to determine whether changes made by the control unit to the operation of the blending system to maintain the composition of the blended low salinity injection water within the operating envelope are effective. If not, the control unit may make further changes to the operation of the blending system. Accordingly, the control unit has a feedback loop for controlling blending of the blended low salinity water stream.

Controlling the amounts of RO permeate and NF permeate that are available for blending in real time by changing the amounts of RO permeate or NF permeate discharged from the blending system via an RO permeate or NF permeate dump line, for example, into a body of water (e.g. the ocean), provides a robust control of TDS content and/or of the concentrations of the one or more individual ions within the operating envelope for the blended low salinity injection water stream, which responds rapidly to changes in the quantity or quality of the PW. Thus, there is a faster response than if an attempt was made to change the flow rates of feed water to the RO and NF arrays of the desalination plant (owing to the dead volumes in the feed lines leading from the RO and NF arrays to the blending point(s) for the blended low salinity injection water stream).

Further, where a high salinity water (e.g., SW) or a clay stabilizing concentrate is available as a blending stream, controlling the degree of opening of the adjustable (variable) valve (e.g., throttle valve) on the high salinity water by-pass line or the adjustable valve (e.g., throttle valve) on the concentrate feed line that delivers clay stabilizer concentrate from the concentrate tank maintains the composition of the blended low salinity injection water within the predetermined operating envelope in response to changes in the quantity or quality of the PW.

It can therefore be seen that the control unit may alter the operation of the blending system in real time by adjusting one of more of the opening degree of the valve on the RO permeate dump line, the opening degree of the valve on the NF dump valve, the opening degree of the valve on the optional high salinity water by-pass line, and the opening degree of the valve on the optional clay stabilizing concentrate feed line.

Typically, the PW stream is required to be reinjected into the reservoir as regulations prevent disposal of produced water into a body of water (e.g. the ocean). At least in the early stage of a low salinity waterflood, PW may be required to be blended into the blended low salinity injection stream in the absence of a dedicated PW disposal well. Accordingly, there may be no ability to adjust the amount of PW in the blended low salinity injection water stream. However, as the low salinity waterflood progresses and a low PV slug of the blended low salinity injection water (see below) has been injected into at least one injection well, at least a portion of the PW may be used as a drive fluid for an injected low pore volume slug of blended low salinity injection water. The person skilled in the art will understand that as more low salinity injection wells are drilled and commissioned over the life of the low salinity waterflood, higher amounts of PW will be produced from the reservoir such that disposal of PW as a drive fluid may not necessarily eliminate the need for disposal of PW by blending with slugs of low salinity injection water. Where a variable amount of the PW may be disposed of by injection into in a produced water disposal well or as an aqueous drive fluid (or as a component of an aqueous drive fluid), the control unit may adjust the amount of PW included in the blended low salinity injection water stream to maintain the composition of the blended low salinity injection water within the predefined (predetermined) operating envelope. Accordingly, the control unit may optionally send instructions to increase the amount of PW that is to be disposed of by injection into the produced water disposal well or to use an increased amount of PW as an aqueous drive fluid.

Various sensors may be included in embodiments of the integrated systems disclosed herein, in particular in the blending system. These sensors may be used to determine the TDS and/or ionic composition of the blended low salinity injection water stream. For example, the TDS of the blended low salinity injection water stream may be determined from its conductivity, while the concentrations of individual ions or types of individual ions may be determined using glass sensors having membranes that are permeable to specific individual ions or specific types of individual ions. Similarly, sensors may be present on the RO and NF permeate feed lines, any combined RO/NF permeate feed line, the PW feed line, and the optional high salinity water by-pass line to obtain data relating to the TDS and ionic composition of the RO permeate stream, NF permeate stream, PW stream, and/or the optional high salinity water stream (and of any combined RO/NF permeate stream). Flow rate sensors may also be provided for determining the flow rates of the various blending streams (RO permeate stream, NF permeate stream, any combined RO/NF permeate stream, the PW stream, the optional high salinity feed water stream, and the optional clay stabilizing concentrate stream) and for determining the flow rates of RO permeate in the RO permeate dump line and NF permeate in the NF dump line.

Accordingly, the blending system may have:
(a) Ion concentration sensors for measuring the salinity or total concentration of dissolved solids (Ct), concentrations of individual ions (Ci) or types of individual ions in the RO permeate, NF permeate, any combined RO/NF permeate stream, PW stream and optional high salinity water (e.g. SW) by-pass stream, optional clay stabilizing concentrate stream, and the blended injection water stream. In particular, the blending system may have ion concentration sensors for measuring at least one of TDS concentration, chloride anion concentration, bromide anion concentration, calcium cation concentration, magnesium cation concentration, potassium cation concentration, nitrate anion concentration and sulfate anion concentration for the RO permeate, NF permeate, any combined RO/NF permeate, PW and optional SW streams.
(b) Flow rate sensors for measuring the flow rates of one or more of: the RO permeate blending stream, the RO permeate dump stream, the NF permeate blending stream, the NF permeate dump stream, any combined RO/NF permeate blending stream, the PW stream, the optional high salinity water (e.g., SW) by-pass stream, the optional clay stabilizing concentrate stream and the blended low salinity injection water stream.

The ion concentration sensors, the flow rate sensors, and any other sensors described herein may communicate with the control unit through any suitable communication technology, such as a direct electrical connection or a wireless electrical connection (e.g., Wi-Fi, Bluetooth).

Optionally, owing to the risk of formation damage during a low salinity water flood, a maximum permitted increase in downhole pressure or wellhead pressure (or a maximum permitted reduction in flow rate for the injection water stream downstream of the injection pump(s)) may be inputted into the control unit (beyond which there is an unacceptable reduction in injectivity). An increase in downhole pressure or wellhead pressure and a decrease in flow rate downstream of the injection pump(s) indicate loss of injectivity arising from formation damage.

Optionally, the downhole pressure in the injection well adjacent the oil-bearing layer of the reservoir or the wellhead pressure (or the flow rate of the blended low salinity injection water downstream of the injection pump(s) for the injection system of the reservoir) may be monitored in real time. The pressure in the injection well may be monitored with a downhole measurement device such as a pressure sensor that is linked to the control unit, for example, via a fibre optic telemetry line.

If the control unit determines there is a decline in injectivity, the control unit may select a different operating envelope for the composition of the blended injection water stream that is predicted to have a lower risk of causing formation damage (while maintaining an acceptable level of EOR from the oil-bearing layer(s) of the reservoir) and may then adjust the blending ratios of the various blending streams such that the injection water composition falls within the different operating envelope. The control unit continues to monitor the downhole pressure or the wellhead pressure (or the flow rate downstream of the injection pump(s)) in real time to determine if the pressure (or flow rate) begins to stabilize in response to injection of a blended low salinity injection water having a composition within the preferred operating window. If not, the control unit may make further changes to the operation of the blending system to adjust the composition of the blended low salinity injection water stream to fall within yet another preferred operating envelope that is predicted to have yet a lower risk of causing formation damage. This process is iterative and may be repeated many times. Optionally, the control unit may take a decision to reduce the flow rate of the injection water or stop injecting the injection water into an injection well if the pressure continues to rise. The control unit may then take the decision to inject a clay-stabilizing composition into the oil-bearing layers of the reservoir for a period of several days before recommencing the low salinity waterflood.

Typically, correlations are inputted into the control unit between the mixing ratios of the various blending streams and the composition of the blended low salinity injection water stream (for example, correlations between the mixing ratios of the various blending streams and one or more of the TDS, osmotic strength, concentrations of individual ions, concentrations of types of individual ions, ratios of individual ions and ratios of types of individual ions of the blended low salinity injection water stream). These correlations may be based on the assumption that the compositions for the NF permeate, RO permeate and high salinity water (e.g. SW) blending stream remain substantially constant (within predetermined tolerances) during operation of the desalination plant. In contrast, as discussed above, the composition of the PW stream may vary over the life of the low salinity waterflood. The mixing ratios of the various blending streams are dependent upon the flow rates of the various blending streams that are supplied to a mixing (blend) point(s) of the blending system to form the blended low salinity injection water stream.

Correlations may also be inputted into the control unit between the opening degree of the NF dump valve, the opening degree of the RO dump valve, the opening degree of the adjustable valve on the optional high salinity water by-pass line and the opening degree of the adjustable valve on the optional clay stabilizing concentrate feed line and the flow rates of NF permeate, RO permeate, optional high salinity water and optional clay stabilizing concentrate blending streams. The control unit may therefore control the blending ratios and hence the composition of the blended low salinity injection water stream by changing the opening degrees of one or more of the above-identified adjustable valves to achieve a composition for the blended low salinity injection water within the predefined (preselected or predetermined) operating envelope. As a result, the flow rates of the various blending streams to be supplied to the mixing point(s) may be adjusted in real time, thereby ensuring the composition of the blended low salinity water lies within the predefined operating envelope.

Typically, the boundary values for the TDS of the injection water during the main phase of the low salinity waterflood may be in the range of 200 to 10,000 mg/L, preferably 500 to 10,000 mg/L. Generally, lower TDS ranges provide higher EOR while higher TDS ranges mitigate the risk of formation damage, especially in reservoirs comprising rocks with high levels of swellable clays Alternative boundary values for the TDS may be, for example, in the range of 500 to 5,000 mg/L, 500 to 3,000 mg/L, 1,000 to 2,000 mg/L, 2000 to 5000 mg/L, or 3000 to 7000 mg/L (depending on the risk of formation damage). The control unit may control the composition of the blended low salinity injection water to within a selected range for the boundary values for the TDS.

Typically, the control unit controls the sulfate anion concentration of the blended low salinity injection water to a value of less than 100 mg/L; preferably, less than 50 mg/L, and most preferably, less than 40 mg/L.

Typically, the control unit controls the total multivalent cation concentration of the blended injection water to within the range of 1 to 250 mg/L; preferably, 3 to 150 mg/L and, in particular, 50 to 150 mg/L with the proviso that the ratio of the multivalent cation content of the blended low salinity injection water to the multivalent cation content of the connate water is less than 1.

Typically, the control unit controls the calcium cation concentration of the blended low salinity injection water to within the range of 1 to 200 mg/L; preferably, 5 to 150 mg/L and, in particular, 50 to 150 mg/L, with the proviso that the ratio of the calcium cation content of the blended low salinity injection water to the calcium cation content of the connate water is less than 1.

Typically, the control unit controls the magnesium cation concentration of the blended low salinity injection water to within the range of 2 to 400 mg/L; preferably, 10 to 300 mg/L and, in particular, 100 to 300 mg/L, with the proviso that the magnesium cation content of the blended low salinity injection water to the magnesium cation content of the connate water is less than 1.

Typically, the control unit controls the potassium cation concentration of the blended low salinity injection water to within the range of 10 to 2000 mg/L and, in particular, 250 to 1000 mg/L, with the proviso that the TDS of the blended low salinity injection water remains within the boundary values for the predefined operating envelope.

The boundary values for the TDS and concentrations of individual ions and the concentration of any clay-stabilizing additive vary depending on the low salinity EOR response for the reservoir and the composition of the rock of the oil-bearing layers of the reservoir, and in particular, on the levels of swellable and migratable clays and minerals that are known to be linked to formation damage.

The boundary values may have been determined by analysing a sample of rock taken from the oil-bearing layer of the reservoir. The samples of the reservoir rock may be, for example, rock cuttings, or a side wall core. Alternatively, the reservoir rock surrounding an injection well may be analysed by geophysical logging using a downhole logging apparatus. Analysis of the rock may include, but is not limited to, identifying the presence (and quantity) of clays and identifying types of clays (and their quantities). Analytical methods for quantifying clays may include geophysical logging, X-ray diffraction (XRD), scanning electron microscopy (SEM), infrared scintillation point counting or sieve analysis. In some further embodiments disclosed herein, analysis of the rock formation may comprise determining an amount of clays in the range from about 2 weight % to about 20 weight %. Analysis of the rock may also include determining the mineral content of the clay fraction of the rock, in particular, clays of the smectite type (such as montmorillonite), pyrophyllite type, kaolinite type, illite type, chlorite type and glauconite type, which can be determined by X-ray diffraction (XRD) or scanning electron microscopy (SEM) analysis. The optimal salinity for the main phase of the waterflood may be determined from correlations of formation damage occurring with different salinity boundary values for the injection water for a range of rock samples with different clay contents and clay compositions and selecting boundary values for the salinity for a rock sample that most closely matches the composition of the rock (i.e. using historical data) for the reservoir that is to be subjected to the low salinity waterflood. Alternatively, experiments may be performed on samples of the rock taken from the region of the reservoir where the injection well has been drilled using different boundary values for the salinity and composition of individual ions for the blended low salinity injection water to determine an optimal envelope for the salinity and composition for the injection water for the main phase of the waterflood.

Typically, the injection capacity for the blended low salinity injection water is limited owing to the limited capacity of the desalination plant or the need to dispose of increasing amounts of produced water over the life of the low salinity waterflood. Accordingly, the low salinity waterflood may be designed to inject a low pore volume (PV) slug of the blended low salinity injection water into the oil-bearing layer of the reservoir from a first injection well in an amount of at least 0.3 pore volumes and, preferably, at least 0.4 pore volumes as slugs having these minimum pore volumes tend to maintain their integrity within the formation. In order to limit the amount of water injected into the reservoir from an injection well, it is preferred that the pore volume of the blended low salinity injection water less than 1, more preferably less than or equal to 0.9 PV, most preferably, less than or equal to 0.7 PV, in particular, less than or equal to 0.6 PV, for example, less than or equal to 0.5 PV.

After injection of the low pore volume of the blended low salinity injection water into the first injection well, a drive water may be injected from the injection well into the oil-bearing layer of the reservoir to ensure that the slug of blended low salinity injection water (and hence the bank of released oil) is swept through the oil-bearing layer of the reservoir to the production well. In addition, the injection of the drive water may be required to maintain the pressure in the reservoir. Typically, the drive water has a greater PV than the slug of aqueous displacement fluid.

Preferably, the drive water is produced water or a mixture of seawater and produced water, depending on the amount of produced water separated at the production facility. The use of produced water as a drive water is advantageous owing to the restrictions on disposal of produced water into the sea. Accordingly, following injection of the slug of low salinity injection water, the first injection well may be used as a produced water disposal well. However, as discussed above, owing to increasing amounts of PW being separated from gas and oil at the production facility as the low salinity waterflood progresses, it may still be necessary to dispose of a portion of the PW in a further slug of blended low salinity injection water that is injected into one or more further low salinity injection wells. These injection wells may be wells that have previously been used for injection of SW or may be low salinity injection wells that are brought into commission either during or following injection of the slug of blended low salinity injection water into the first low salinity injection well.

Embodiments in accordance with the principles described herein will now be illustrated by reference to FIG. 1.

Figure 1:
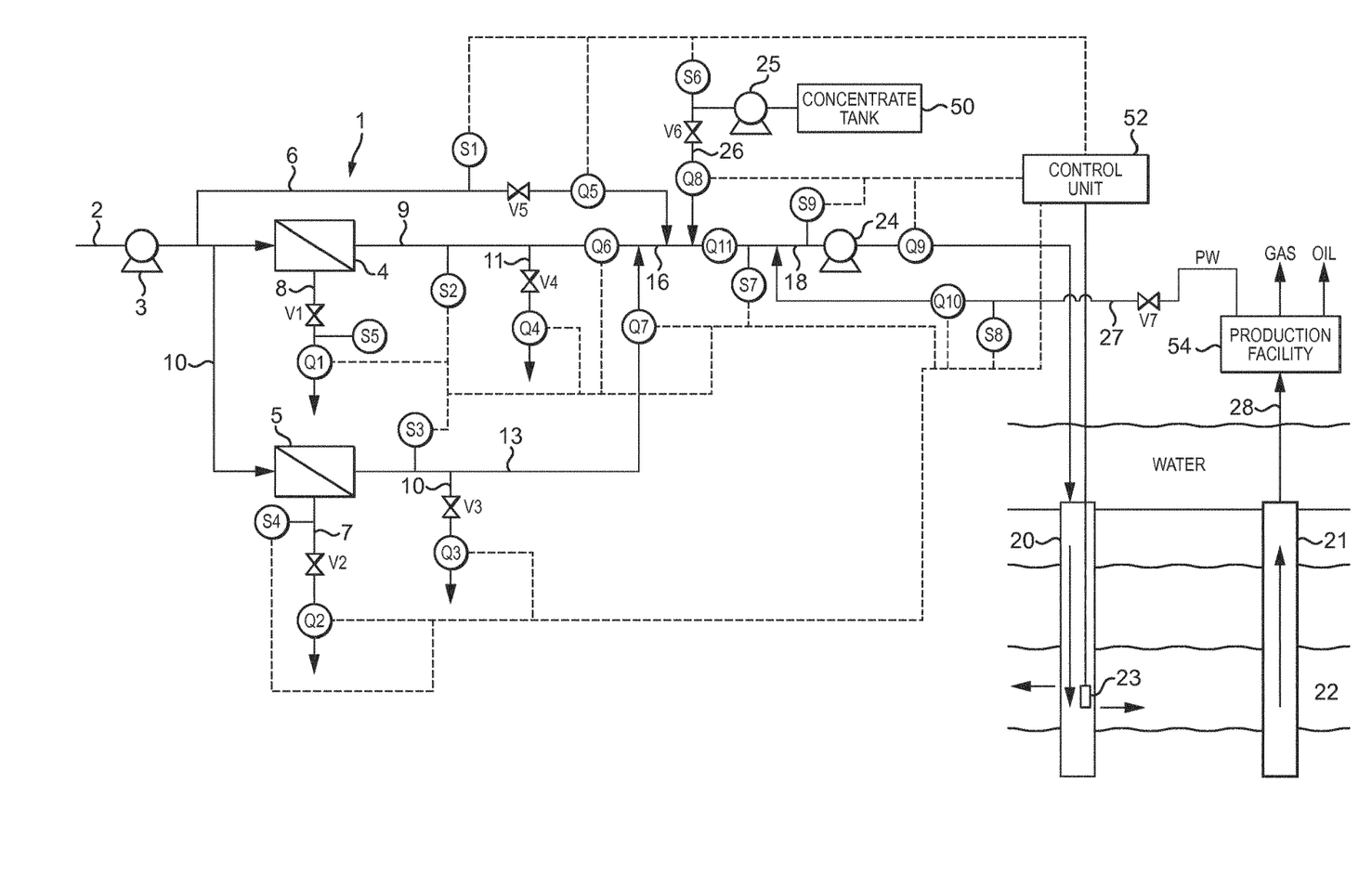

FIG. 1 shows an integrated system for producing a low salinity injection water for a reservoir having an oil-bearing layer 22 penetrated by at least one injection well 20 and at least one production well 21. The integrated system comprises: a desalination plant comprised of a membrane block 1 for treating a feed water 2 (typically seawater); a blending system comprising various flow lines for forming a blended low salinity injection water, an optional concentrate tank 50 and pump 25 for a clay stabilizing concentrate; and, a control unit 52 for controlling the operation of the desalination plant and for controlling blending of the low salinity injection water stream in the blending system. The integrated system also comprises an injection system comprising one or more injection pumps 24 for the injection well 20 and a production facility 54 in fluid communication with a production line 28 of the production well 21. The production facility 54 also has a PW flow line 27 in fluid communication with the blending system.

The membrane block 1 has a feed pump 3, an RO array 4 and an NF array 5 (each array may be either a single or multistage array). Both the RO array and the NF array may have the same feed water (for example, SW) as shown in FIG. 1. However, it is also envisaged that RO concentrate (also referred to in the art as "retentate") from a first RO stage may be divided to form a feed stream for a second RO stage and for an NF array.

The RO array 4 comprises a plurality of RO units. The NF array 5 comprises a plurality of NF units. Typically, the number of units of the RO array and the number of units of the NF array are chosen to match the required production capacity of RO permeate and NF permeate for the blended low salinity injection water stream during the main phase of the low salinity waterflood. The desalination plant may also be provided with a by-pass line 6 for the feed water 2 (for example, SW).

The integrated system has valves V1 to V7 and various flow lines (conduits) configured to provide the flow paths described below. Valves V1 to V7 may be throttle valves and the degree of opening of the throttle values may be set by the control unit (i.e. fully open position, fully closed position, or various intermediate positions). Accordingly, the control unit 52 may control the flows and pressures through the membrane block by controlling the feed pump 3, valves V1 to V5 or any combination thereof (for clarity, electrical connections between the control unit 52, the feed pump 3, and the valves V1 to V5 are omitted from FIG. 1; in some embodiments, communications between the control unit 52 and the feed pump 3 an valves V1 to V5 may comprise wireless communications, such as Wi-Fi or Bluetooth).

Flow rate sensors Q1 to Q11 are provided for determining the flow rates in the various flow lines of the integrated system. Flow rate data may be sent from the flow rate sensors Q1-Q11 to the control unit 52 via electrical signal lines (the dotted lines in FIG. 1) or through wireless communications, such as Wi-Fi or Bluetooth communications. Optionally, the flow rate sensors Q1 and Q2 on the RO concentrate and NF concentrate lines 8 and 7, respectively, may be omitted.

Ion concentration sensors S1 to S9 are also provided for determining the total concentration of dissolved ions (TDS) and/or the concentration of individual ions or types of individual ions (such as multivalent cations or divalent cations) in the various flow lines. Ion concentration data are also sent from the ion concentration sensors S1-S9 to the control unit 52 via electrical signal lines (dotted lines shown in FIG. 1) or through wireless communications, such as Wi-Fi or Bluetooth communications. Optionally, the sensors S4 and S6 on the NF concentrate and RO concentrate lines 7 and 8, respectively, may be omitted. The sensor S6 on the optional clay stabilizer concentrate feed line 26 may also be omitted if the concentration of the additive in the concentrate tank has previously been measured and remains stable over time (in which case, the measured concentration of additive in the concentrate may be inputted into the control unit 52). It is also envisaged that the sensors S1, S2, and S3 on the optional SW by-pass line 6, on the RO permeate feed line 9, and on the NF permeate feed line 13, respectively, may be omitted when the compositions of the SW, RO permeate and NF permeate are predicted to remain substantially constant over time.

In the configuration of FIG. 1, feed pump 3 pumps feed water 2 to the RO array 4 where the feed water is separated into an RO permeate (that flows through RO permeate feed line 9) and an RO concentrate (that flows through RO concentrate feed line 8) and to the NF array 5 where the feed water is separated into an NF permeate (that flows through NF permeate feed line 13) and NF concentrate (that flows through NF concentrate feed line 7) to the blending system. The pressures of the feed water to the RO and NF arrays may be adjusted (for example, using a booster pump for the RO feed or a pressure let down valve for the NF feed) to match the operating pressures of the RO units of the RO array 4 and the NF units of the NF array 5 (NF units are typically operated at a lower pressure than RO units). Optionally, the feed pump 3 pumps a portion of the feed water (for example, SW) through the by-pass line 6 to the blending system. Valves V1 and V2 are at least partially open to provide a bleed of RO concentrate and NF concentrate, respectively, from the blending system. Typically, the RO concentrate and NF concentrate bleed streams are discharged to a body of water (e.g. the sea) via lines 8 and 7, respectively. The NF permeate may then be injected into the RO permeate to form a combined RO/NF permeate stream that flow through line 16. Optionally, the combined RO/NF permeate stream also includes SW and/or a clay stabilizing concentrate (added via feed lines 6 and/or 26, respectively).

The fluids produced from the production well 21 are passed to the production facility 54 via production line 28. The produced fluids are separated in the production facility 54 into an oil stream, gaseous stream and produced water (PW) blending stream. The PW blending stream flows to the blending system via line 27 where it is injected into the combined RO/NF permeate blending stream flowing through line 16 to form a blended low salinity injection water stream. The blended low salinity injection water stream is then injected into the injection well 20 through injection line 18. However, it is envisaged that the NF permeate, RO permeate, PW, optional SW and optional clay-stabilizing concentrate blending streams may be combined in any order, including at a single blending point.

As discussed above, boundary values for the composition of the blended low salinity injection water (for example, boundary values for the TDS content, concentrations of one or more individual ions, concentrations of types of individual ions, concentration ratios of individual ions, concentration ratios of types of individual ions or the concentrations of one or more clay stabilizing additives in the blended low salinity injection water) are inputted into the control unit 52 thereby defining an operating envelope (i.e. a first operating envelope) that maximizes EOR from the oil bearing layer 22 of the reservoir whilst mitigating the risk of formation damage, souring or scaling of the reservoir.

Typically, different compositions for the blended low salinity injection water (TDS, concentrations of one or more individual ions, concentrations of types of individual ions, concentration ratios of individual ions, concentration ratios of types of individual ions or concentrations of one or more clay-stabilizing additives) are correlated with different blend ratios for the combined RO/NF permeate stream and the PW stream (or different flow rates of the combined RO/NF permeate stream and the PW stream to the blending point or different % volumes of the RO/NF permeate stream and PW stream in the blended low salinity injection water stream). The different compositions are also correlated with different compositions of the PW stream and with different compositions for the combined RO/NF permeate stream (including compositions for the combined RO/NF permeate stream that include SW and one or more clay-stabilizing additives). These correlations may be inputted into the control unit so that the control unit 52 may control the operation of the blending system to alter the blend ratio of the combined NF/RO permeate stream with the PW stream and/or the composition of the combined NF/RO permeate stream that is blended with the PW (or the flow rate of the combined RO/NF permeate stream or percentage volumes of the combined RO/NF permeate stream in the blended low salinity injection water stream) to provide a composition for the blended low salinity injection water falling within the operating envelope.

As discussed above, the quantity (flow rate) and/or quality (composition) of the PW may vary over time. The control unit 52 may send instructions to alter the operation of the blending system, in real time in response to changes in the quantity and/or quantity of the PW, to alter the flow rate and/or composition of the combined NF/RO permeate stream that is blended with the PW such that the composition of the blended low salinity injection water stream remains within the operating envelope (e.g., the first operating envelope). For example, the blending ratio of the NF and RO permeate streams (and hence the composition of the combined RO/NF permeate stream) and the flow rate (amount) of the combined RO/NF permeate stream may be adjusted by the control unit 52 sending instructions to vary the degree of opening of the throttle valve V4 on the RO permeate dump line 11 or the degree of opening of throttle valve V3 on the NF permeate dump line 10.

The control unit 52 may also alter the operation of the blending system, in real time, in response to changes in the quantity and/or quantity of the PW, to adjust the flow rates (amounts) of optional SW and/or clay-stabilizing concentrate included in the combined RO/NF permeate stream. Thus, for example, the control unit 52 may send instructions to vary the degree of opening of the throttle valves V5 and/or V6 on the optional SW by-pass line 6 and the optional clay-stabilizing concentrate feed line 26 respectively.

The control unit 52 may monitor the flow rate and composition of the PW stream in real time using flow rate sensor Q10 and sensor S8, respectively, on the PW flow line 27 and also the flow rate and composition of the combined RO/NF stream in real time using flow rate sensor Q11 and sensor S7, respectively, to determine whether the changes made to the operation of the plant were effective in maintaining the composition of the blended low salinity injection water within the operating envelope. If not, the control unit 52 may make further adjustments to the operation of the blending system. Thus, the integrated system of FIG. 1 for producing the blended low salinity injection water stream has a control unit 52 that includes a feedback loop that enables the integrated system to continuously adjust the composition of the blended low salinity injection water stream to remain within the operating envelope in response to changes in the quantity or quality of the PW.

It is also envisaged that alternative boundary values may be inputted into the control unit 52 where the alternative boundary values define alternative operating envelopes (second, third, etc. operation envelopes) for the composition of the blended low salinity injection water that may further mitigate the risk of formation damage, souring or scaling of the reservoir while maintaining acceptable EOR from the reservoir.

Accordingly, in addition to maintaining the composition of the blended injection water within an operating envelope (e.g. first operating envelope) in response to changes in the quantity and/or quality of the PW, the control unit 52 may monitor pressure sensor 23 for any increase in pressure adjacent the oil-bearing interval 22 of the injection well or may monitor the flow sensor Q9 located downstream of the injection pump(s) 24 of the injection system for any decrease in flow rate (both of which may be indicative of an unacceptable decrease in injectivity arising from formation damage). Values for a maximum permitted increase in pressure and/or a maximum permitted decrease in flow rate may be inputted into the control unit 52 (where these values are correlated with an acceptable decrease in injectivity). If the pressure in the well adjacent the oil-bearing interval increases to a value that approaches or reaches the maximum permitted increase in pressure or the flow rate downstream of the injection pump(s) 24 decreases to a value that approaches or reaches the maximum permitted decrease in flow rate, the control unit 52 may select an alternative operating envelope for the composition of the blended low salinity injection water (e.g. one of the second, third etc. operating envelopes) that is predicted to reduce the risk of formation damage. For example, the alternative operating envelope for the composition of the blended low salinity injection water may be defined by one or more of: higher boundary values for the TDS; higher boundary values for divalent cation content (in particular calcium cation content); or, higher boundary values for the one or more clay stabiliser additives. The control unit 52 may then control the operation of the blending system to adjust the composition and flow rate of the combined RO/NF stream such that the blended injection water stream has a composition falling within the alternative operating envelope. For example, this may be achieved by the control unit 52 sending instructions to increase the amount of RO permeate dumped via the RO permeate dump line 11, to increase the divalent cation content of the combined RO/NF permeate stream by increasing the amount of SW in the combined RO/NF permeate stream, or, to increase the amount of clay-stabilizing concentrate in the combined RO/NF stream (by changing the degree of opening of one or more of throttle valves V4, V5 or V6 respectively). The control unit 52 may monitor the impact of the change in operation of the blending system on the flow rate or composition of the combined RO/NF permeate stream (using flow rate sensor Q11 and sensor S7, respectively) and on the flow rate or composition of the blended injection water stream using flow rate sensor Q9 and sensor S9, respectively, to determine if the adjustments to the operation of the plant have resulted in the flow rate and composition of the blended injection water stream falling within the alternative operating envelope and, if necessary, may make further adjustments to the operation of the blending system to achieve a composition within the alterative operating envelope. Thus, the integrated system of FIG. 1 has a control unit 52 with a feedback loop that enables the blending system to produce a blended low salinity injection water stream 18 falling within an alternative operating envelope.

It is envisaged that where there are a plurality of injection wells that there may be dedicated injection water lines for each injection well and that embodiments of the integrated systems disclosed herein may be used to produce blended injection water streams having compositions specifically tailored for each injection well.

Where a low pore volume slug of the blended low salinity injection water has been injected into at least one of the plurality of injection wells, for example, into injection well 20, it is envisaged that the dedicated injection line for the injection well may be used to inject PW (from PW flow line 27) or a blend of SW and PW (from by-pass line 6 and PW flow line 27) as an aqueous drive fluid for driving the low pore volume slug of blended low salinity injection water and hence a bank of released oil toward the production well 21. Accordingly, the RO permeate and NF permeate streams are no longer required for injection well 20 and may be diverted for producing one or more blended low salinity injection water streams for one or more alternative injection wells.

The invention claimed is:

1. An integrated system comprising:
a desalination plant comprising a reverse osmosis (RO) array configured to produce an RO permeate blending stream and a nanofiltration (NF) array configured to produce an NF permeate blending stream;
a blending system;
a control unit;
an injection system for one or more injection wells, wherein the one or more injection wells penetrate an oil-bearing layer of a reservoir; and
a production facility configured to: separate fluids produced from one or more production wells that penetrate the oil-bearing layer of the reservoir and deliver a produced water (PW) stream to the blending system,
wherein the blending system is configured to blend the RO permeate and the NF permeate blending streams with the PW stream to produce a blended low salinity water stream,
wherein the control unit is configured to:
dynamically alter operation of the blending system to adjust amounts of at least one of the RO permeate blending stream or the NF permeate blending stream to maintain a composition of the blended low salinity water stream within a predetermined operating envelope; and
dynamically adjust amounts of at least one of the RO permeate discharged from the blending system via an RO permeate dump line or the NF permeate discharged from the blending system via an NF permeate dump line.

2. The integrated system of claim 1, wherein the control unit is configured to receive the operating envelope from a source external to the control unit.

3. The integrated system of any one of the preceding claims, wherein the operating envelope specifies upper and lower limits for a parameter selected from the group consisting of: total dissolved solids (TDS) content; ionic strength; concentrations of individual ions; concentration of types of individual ions; ratios of types of individual ions; and ratios of individual ions.

4. A method comprising:
producing a reverse osmosis (RO) permeate blending stream using an RO array of a desalination plant;
producing a nanofiltration (NF) permeate blending stream using an NF array of a desalination plant;
separating fluids produced from one or more production wells that penetrate an oil-bearing layer of a reservoir to produce a produced water (PW) stream;
blending the RO permeate blending stream, the NF permeate blending stream, and the PW stream in a blending system to produce a blended low salinity water stream;
dynamically adjusting operation of the blending system to adjust amounts of the RO permeate blending stream and the NF permeate blending stream to maintain a composition of the blended low salinity water stream within a predetermined operating envelope; and
dynamically adjust amounts of at least one of the RO permeate discharged from the blending system via an RO permeate dump line or the NF permeate discharged from the blending system via an NF permeate dump line.

5. The method of claim 4, wherein blending comprises blending seawater (SW) with the RO permeate blending stream, the NF permeate blending stream, and the PW stream in the blending system to produce a blended low salinity water stream.

6. The method of claim 4, wherein dynamically adjusting the operation of the blending system comprises adjusting a valve in the blending system.

7. The method of claim 6, wherein the valve comprises a valve on the RO permeate dump line.

8. The method of claim 6, wherein the valve comprises a valve on the NF permeate dump line.

9. The method of claim 6, wherein the valve comprises a valve on a high salinity water by-pass line that by-passes the desalination plant and feeds seawater (SW) to the blending system.

10. An integrated system comprising:
a control unit;
a plurality of valves controlled by the control unit;
a plurality of flow rate and composition monitors configured to provide measured flow rate data and composition data, respectively, to the control unit;
a reverse osmosis (RO) array configured to produce an RO permeate blending stream;
a nanofiltration (NF) array configured to produce an NF permeate blending stream;
a produced water (PW) stream from a production well; and
a blending system comprising a line configured to blend the RO permeate blending stream, the NF permeate blending stream, and the PW stream into a blended low salinity water stream,
wherein the control unit is configured to:
adjust, in response to the measured flow rate and composition data, at least one of the plurality of valves to maintain a composition of the blended low salinity water stream within a predetermined operating envelope, and adjust amounts of at least one of the RO permeate discharged from the blending system via an RO permeate dump line or the NF permeate discharged from the blending system via an NF permeate dump line.

11. The integrated system of claim 10, wherein the flow rate data and composition data pertain to the blended low salinity water stream.

12. The integrated system of claim 10, further comprising an injection system configured to deliver the blended low salinity water stream to a formation via an injection well.

13. The integrated system of claim 10, wherein the operating envelope specifies upper and lower limits for a parameter selected from the group consisting of: total dissolved solids (TDS) content; ionic strength; concentrations of individual ions; concentration of types of individual ions; ratios of types of individual ions; and ratios of individual ions.

14. The integrated system of claim 10, wherein the plurality of valves includes a first valve on an RO permeate dump line and further includes a second valve on an NF permeate dump line.

* * * * *